(12) United States Patent
Unge

(10) Patent No.: US 12,449,146 B2
(45) Date of Patent: Oct. 21, 2025

(54) METHOD FOR CLEANING AN EVAPORATIVE HUMIDIFIER AND COOLER APPARATUS AND A SYSTEM COMPRISING AN EVAPORATIVE HUMIDIFIER AND COOLER APPARATUS

(71) Applicant: MUNTERS EUROPE AKTIEBOLAG, Kista (SE)

(72) Inventor: Daniel Unge, Skarpnäck (SE)

(73) Assignee: Munters Europe Aktiebolag, Kista (SE)

( * ) Notice: Subject to any disclaimer, the term of this patent is extended or adjusted under 35 U.S.C. 154(b) by 600 days.

(21) Appl. No.: 17/795,423

(22) PCT Filed: Jan. 18, 2021

(86) PCT No.: PCT/SE2021/050024
§ 371 (c)(1),
(2) Date: Jul. 26, 2022

(87) PCT Pub. No.: WO2021/154139
PCT Pub. Date: Aug. 5, 2021

(65) Prior Publication Data
US 2023/0087068 A1 Mar. 23, 2023

(30) Foreign Application Priority Data
Jan. 31, 2020 (SE) .................................... 2050102-9

(51) Int. Cl.
*F24F 6/04* (2006.01)
*F24F 11/00* (2018.01)
(Continued)

(52) U.S. Cl.
CPC ............ *F24F 6/04* (2013.01); *F24F 11/0008* (2013.01); *F24F 11/30* (2018.01); *F28C 3/08* (2013.01);
(Continued)

(58) Field of Classification Search
CPC ................................................ F24F 2221/225
See application file for complete search history.

(56) References Cited

U.S. PATENT DOCUMENTS

| 6,378,332 B1 | 4/2002 | Billingham et al. |
| 10,228,150 B2 | 3/2019 | Lee et al. |
| (Continued) | | |

FOREIGN PATENT DOCUMENTS

| AU | 2014218482 A1 | 9/2014 |
| DE | 31 44 915 A1 | 12/1982 |
| (Continued) | | |

OTHER PUBLICATIONS

Office Action dated Dec. 20, 2023, in Canadian Patent Application No. 3,165,497.
(Continued)

*Primary Examiner* — Ko-Wei Lin
(74) *Attorney, Agent, or Firm* — MEDLER FERRO WOODHOUSE & MILLS PLLC

(57) ABSTRACT

The invention relates to a method, performed by a control device (100), for cleaning an evaporative humidifier and cooler apparatus (1) for humidification and cooling of air, the apparatus (1) comprises: a cooling and humidification media (2), which is configured to receive and evaporate a fluid (4); a fluid distribution element (6), which is configured to distribute the fluid (4) to the cooling and humidification media (2); and a tray (8) arranged to collect fluid (4) downstream of the cooling and humidification media (2), wherein the fluid (4) distributed by the fluid distribution element (6) is collected from the tray (8). The method comprises: determining (s101) the condition of the cooling and humidification media (2) based on data from a sensor device (10) arranged in fluid communication with the fluid (4) downstream of the cooling and humidification media (2); and supplying (s102) at least one cleaning fluid (12; 14) to
(Continued)

the cooling and humidification media (2) dependent on the condition of the cooling and humidification media (2). The invention also relates to a system (200) comprising an evaporative humidifier and cooler apparatus (1) for humidification and cooling of air, a control device (100) and a sensor device (10) arranged in communication with the control device (100).

14 Claims, 6 Drawing Sheets

(51) Int. Cl.
  *F24F 11/30* (2018.01)
  *F28C 3/08* (2006.01)
  *F28F 9/00* (2006.01)
  *F28F 25/02* (2006.01)
  *F28G 9/00* (2006.01)
  *F24F 6/00* (2006.01)
  *F24F 140/00* (2018.01)
  *F28F 25/00* (2006.01)

(52) U.S. Cl.
  CPC ............... *F28F 9/00* (2013.01); *F28F 25/02* (2013.01); *F28G 9/00* (2013.01); *F24F 2006/008* (2013.01); *F24F 2006/046* (2013.01); *F24F 2140/00* (2018.01); *F24F 2221/225* (2013.01); *F28F 2025/005* (2013.01); *F28F 2265/20* (2013.01)

(56) References Cited

U.S. PATENT DOCUMENTS

| | | |
|---|---|---|
| 2005/0079124 A1 | 4/2005 | Sanderson |
| 2014/0174116 A1 | 6/2014 | Habeebullah |
| 2014/0238643 A1* | 8/2014 | Hains ................ F28G 9/00 165/95 |
| 2015/0153052 A1 | 6/2015 | Saito et al. |
| 2015/0330725 A1 | 11/2015 | Gurney |
| 2017/0108251 A1 | 4/2017 | Dinnage |

FOREIGN PATENT DOCUMENTS

| | | |
|---|---|---|
| DE | 20 2012 011 401 U1 | 3/2013 |
| EP | 3 070 413 A1 | 9/2016 |
| GB | 2555558 A | 5/2018 |
| JP | 2007-315712 A | 12/2007 |
| JP | 2011-089769 A | 5/2011 |
| JP | 2013-053767 A | 3/2013 |
| JP | 2013-208568 A | 10/2013 |
| JP | 2018-530733 A | 10/2018 |
| JP | 2019174052 A * | 10/2019 |
| KR | 20160140328 A | 12/2016 |
| WO | 2014045668 A1 | 3/2014 |
| WO | 2019/130345 A1 | 7/2019 |

OTHER PUBLICATIONS

European Search Report dated Jan. 15, 2024, in European Patent Application No. 21747763.7.
Office Action dated Oct. 10, 2024, in Canadian Patent Application No. 3,165,497.
Search Report and Written Opinion dated Jan. 14, 2025, in Singaporean Patent Application No. 11202250139H.
Written Opinion of the International Searching Authority dated Mar. 11, 2021, in International Application No. PCT/SE2021/050024.
Office Action dated Jan. 15, 2025, in Korean Patent Application No. 10-2022-7029026.
Examination Report dated Jan. 28, 2025, in Australian Patent Application No. 2022283514.
International Search Report dated Mar. 11, 2021, in International Application No. PCT/SE2021/050024.
Office Action dated Jan. 20, 2025 in Japanese Patent Application No. 2022-534457.
Office Action dated Apr. 15, 2024, in Brazil Patent Application No. BR112022012796-0.
Office Action dated Jul. 2, 2025, in Japan Patent Appln. No. 2022-534457.

* cited by examiner

METHOD FOR CLEANING AN EVAPORATIVE HUMIDIFIER AND COOLER APPARATUS AND A SYSTEM COMPRISING AN EVAPORATIVE HUMIDIFIER AND COOLER APPARATUS

TECHNICAL FIELD

The invention relates to a method, performed by a control device, for cleaning an evaporative humidifier and cooler apparatus, and also to a system comprising an evaporative humidifier and cooler apparatus according to the appended claims. Further, the invention relates to a computer program and to a computer-readable medium according to the appended claims.

BACKGROUND AND PRIOR ART

Evaporative humidifiers and cooler apparatuses are used to humidify and cool different types of spaces in buildings. Electric equipment within a building may generate heat, which increases the temperature within the building. Increased temperature may decrease the performance of the equipment. Electric equipment may also be sensitive to static electricity. If the humidity in a space within the building falls below a certain level, static electricity may be generated.

Evaporative humidifiers and cooler apparatuses comprises an inorganic non-combustible cooling and humidification media, also known as an evaporative media. Fluid, such as water, is supplied to the top of the evaporative media via a fluid distribution element. The water flows down the evaporative media, which may have a corrugated surface. As warm and dry air passes through the evaporative media, it evaporates a proportion of the water and thus produces cold, humidified air. The rest of the water assists in washing and cleaning the evaporative media, and is drained to a fluid tray. The warm and dry air may be directed through the evaporative media by means of a forced air flow, which is generated by a fan.

The energy that is needed for the evaporation of the fluid is taken from the air itself. The air that leaves the apparatus is therefore humidified and cooled simultaneously without any external energy supply for the evaporation due to an adiabatic cooling process.

The tray is filled with fluid from a fluid supply. When there is a humidity and cooling demand, a pump starts and circulates the fluid over the evaporative media via the fluid distribution element. The fluid may contain a certain amount of minerals and salts with a predetermined concentration. During the evaporation, the fluid is released to the air. The minerals and salts remain in the fluid and are returned to the fluid tray. A proportion of the fluid in the fluid tray is continually drained and replaced with fresh fluid from the supply in order to control the mineral concentration.

SUMMARY OF THE INVENTION

In addition to the remaining minerals and salts in the fluid, also bacteria and fungi may be formed in the fluid and on the cooling and humidification media. Minerals, salt, bacteria and/or fungi in the fluid may also result in deposits and sediments on the cooling and humidification media, resulting in a need for de-scaling of the cooling and humidification media.

Thus, there is a need to develop a method for cleaning an evaporative humidifier and cooler apparatus, which is based on the condition of a cooling and humidification media of the apparatus. There is also a need to develop a computer program and a computer-readable medium for executing the method. Also, there is a need to develop a system comprising an evaporative humidifier and cooler apparatus for humidification and cooling of air, which evaporative humidifier and cooler apparatus is cleaned based on the condition of a cooling and humidification media of the apparatus.

The object of the invention is therefore to develop a method for cleaning an evaporative humidifier and cooler apparatus, which is based on the condition of a cooling and humidification media of the apparatus.

A further object of the invention is to develop a computer program and a computer-readable medium for executing the method.

Another object of the invention is to develop a system comprising an evaporative humidifier and cooler apparatus for humidification and cooling of air, which evaporative humidifier and cooler apparatus is cleaned based on the condition of a cooling and humidification media of the apparatus.

These objects are achieved with the above-mentioned method for cleaning an evaporative humidifier and cooler apparatus, the above-mentioned system comprising an evaporative humidifier and cooler apparatus and to the above-mentioned computer program and computer-readable medium according to the appended claims.

According to an aspect of the invention a method, performed by a control device, for cleaning an evaporative humidifier and cooler apparatus for humidification and cooling of air is provided. The apparatus comprises: a cooling and humidification media, which is configured to receive and evaporate a fluid; a fluid distribution element, which is configured to distribute the fluid to the cooling and humidification media; and a tray arranged to collect fluid downstream of the cooling and humidification media; wherein the fluid distributed by the fluid distribution element is collected from the tray. The method comprises: determining the condition of the cooling and humidification media based on data from a sensor device arranged in fluid communication with the fluid downstream of the cooling and humidification media; and supplying at least one cleaning fluid to the cooling and humidification media dependent on the condition of the cooling and humidification media.

The evaporative humidifier and cooler apparatus will be cleaned dependent on the condition of the cooling and humidification media. The sensor device is configured to detect characteristics of the fluid. Based on data achieved from the detection of the characteristics of the fluid, the condition of the cooling and humidification media can be determined. The type of cleaning is performed based on the condition of the cooling and humidification media. Dependent on the condition of the cooling and humidification media, at least one cleaning fluid is supplied to the cooling and humidification media. The data from the sensor device is communicated to the control device. The data is processed in the control device and based on the data from the sensor device a suitable cleaning fluid or a combination of cleaning fluids may be supplied to the cooling and humidification media. The at least one cleaning fluid may be supplied directly to the cooling and humidification media or to the fluid, which is distributed by the fluid distribution element to the cooling and humidification media. When supplying the at least one cleaning fluid to the cooling and humidification media, the evaporative humidifier and cooler apparatus will be cleaned.

The fluid used in the apparatus will contain a certain amount of substances, such as salts and minerals, the concentration of which varies from place to place. During the cooling and humidification process, fluid free from such substances is released to the air. The substances remain in the fluid in the apparatus and are returned to the fluid tray. The method will keep the surface of the cooling and humidification media clean. The result is that the service life of the cooling and humidification media may be significantly extended.

According to an aspect of the invention a system comprising an evaporative humidifier and cooler apparatus for humidification and cooling of air, a control device and a sensor device arranged in communication with the control device is provided. The apparatus comprising: a cooling and humidification media, which is configured to receive and evaporate a fluid; a fluid distribution element, which is configured to distribute the fluid to the cooling and humidification media; and a tray arranged to collect fluid downstream of the cooling and humidification media; wherein the fluid distributed by the fluid distribution element is collected from the tray; and wherein the control device is configured to determine the condition of the cooling and humidification media based on data from the sensor device arranged in fluid communication with the fluid downstream of the cooling and humidification media; and supply at least one cleaning fluid to the cooling and humidification media dependent on the condition of the cooling and humidification media.

The evaporative humidifier and cooler apparatus of the system will be cleaned by the at least one cleaning fluid. The sensor device is arranged in fluid communication with the fluid downstream of the cooling and humidification media. In a circulating process, where the fluid is collected in a tray after the fluid has passed the cooling and humidification media, the fluid is brought back to the cooling and humidification media by for an example a circulating pump. Thus, the sensor device may be arranged in fluid communication with the fluid at any position in a circuit containing the cooling and humidification media, since any position in a circuit will be a position downstream of the cooling and humidification media. Data from the sensor device is communicated to the control device. The data is processed in the control device. Based on the data, the condition of the cooling and humidification media can be determined and thus a suitable cleaning fluid or a combination of cleaning fluids may be supplied to the cooling and humidification media. When supplying the at least one cleaning fluid to the cooling and humidification media, the evaporative humidifier and cooler apparatus will be cleaned.

The apparatus of the system uses the physical principle of fluid evaporation. Air is forced through the cooling and humidification media by a fan. While the air passes through the wet cooling and humidification media, it releases heat to the fluid, thereby cooling itself. The quantity of moisture present in the air determines the level of temperature reduction of the air treated.

Additional objectives, advantages and novel features of the invention will be apparent to one skilled in the art from the following details, and through exercising the invention. While the invention is described below, it should be apparent that the invention may be not limited to the specifically described details. One skilled in the art, having access to the teachings herein, will recognize additional applications, modifications and incorporations in other areas, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various figures, and in which.

DETAILED DESCRIPTION OF THE DRAWINGS

Figure 1:
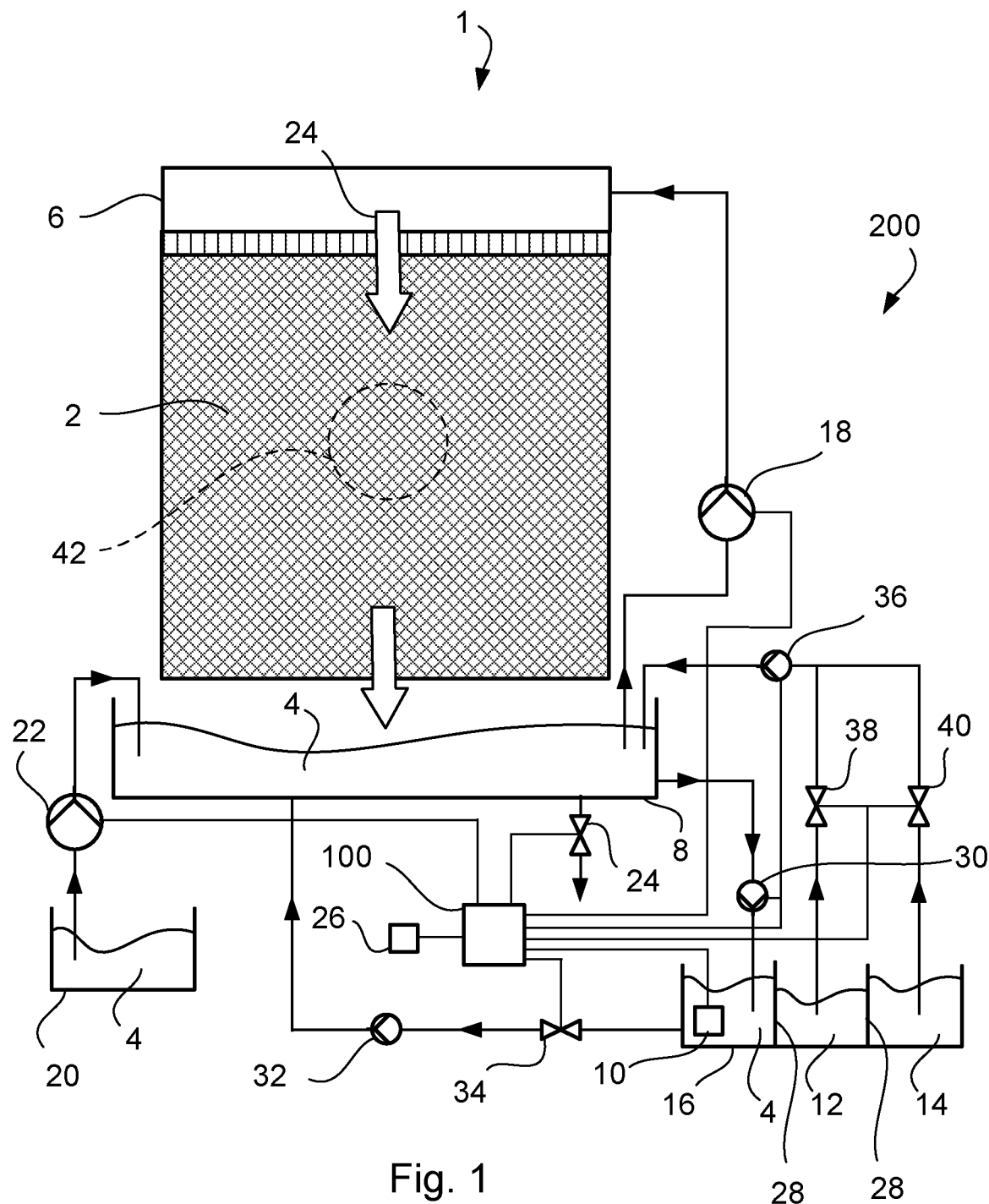
FIGS. 1-4 schematically illustrate systems according to different examples.

According to the present disclosure, a method, performed by a control device, for cleaning an evaporative humidifier and cooler apparatus for humidification and cooling of air is provided. The apparatus comprises: a cooling and humidification media, which is configured to receive and evaporate a fluid; a fluid distribution element, which is configured to distribute the fluid to the cooling and humidification media; and a tray arranged to collect fluid downstream of the cooling and humidification media; wherein the fluid distributed by the fluid distribution element is collected from the tray. The method comprises: determining the condition of the cooling and humidification media based on data from a sensor device arranged in fluid communication with the fluid downstream of the cooling and humidification media; and supplying at least one cleaning fluid to the cooling and humidification media dependent on the condition of the cooling and humidification media.

Such method is performed by a control device. The control device may be a component of the evaporative humidifier and cooler apparatus or a component independent and arranged at a distance from the evaporative humidifier and cooler apparatus. The evaporative humidifier and cooler apparatus may be configured for humidification of air. Thus, the apparatus may increase the humidity in air or keep the humidity in air at a predetermined level. The apparatus may also decrease the temperature of air or keep the temperature at a constant level. The cooling and humidification media is made of a material which is able to receive and evaporate a fluid. The cooling and humidification media may have a corrugated surface, which increases the surface of the media. The cooling and humidification media may be arranged in cassettes, which are supported by a rigid frame of the apparatus. The fluid, received and evaporated by the media, may be water or any other suitable fluid which may be evaporated by the media. The fluid may preferably be environmentally friendly.

The fluid distribution element is configured to distribute the fluid to the cooling and humidification media. The fluid may flow over and through the cooling and humidification media by means of gravity. A first fluid pump may be connected to the fluid distribution element, wherein the first fluid pump is configured to deliver fluid to the fluid distribution element. The first fluid pump may suck the fluid from the tray and deliver the fluid to the fluid distribution element. The first fluid pump may be driven by and electric motor. The first fluid pump may be driven at different speeds in order to deliver fluid to the fluid distribution element with different flow rates and different volume flows. During start up of the apparatus, an increased flow of fluid may be provided by the first fluid pump to the fluid distribution element, in order to increase the wetting of the cooling and humidification media. When the cooling and humidification media has absorbed the fluid, and is completely wet, the flow of fluid provided by the first fluid pump may be reduced to a normal fluid delivery level. When shutting down the apparatus, the first fluid pump is stopped, so no fluid is delivered to the fluid distribution element. The fluid distribution element may be connected to the frame of the cassette. The fluid distribution element may be an elongated sprinkler, arranged at the top of the media. The fluid distribution element may have small calibrated holes orientated upwards. This design feature prevents the clogging and thus ensures efficient water distribution over the entire cooling and humidification media. Efficient water distribution over the entire cooling and humidification media is also ensured even in cases where the cooling and humidification media are not perfectly horizontally aligned, for example due to ground movements. Alternatively, or in combination with the elongated sprinkler, a single fluid nozzle may be arranged to distribute fluid to the media.

The tray is arranged to collect fluid downstream of the cooling and humidification media. Fluid distributed to the cooling and humidification media will be released to the surrounding air in the space to be treated by the evaporative humidifier and cooler apparatus. However, not all fluid distributed to the media will be released to the surrounding air and therefore fluid may flow by means of gravity along the media and into the tray arranged downstream or below the media. As mentioned above, the first fluid pump may suck the fluid from the tray and deliver the fluid to the fluid distribution element. Since fluid is released to the surrounding air, fluid should continuously be supplied to the tray from a fluid supply tank or from a fluid pipe network. The fluid from the fluid supply tank or from the fluid pipe network may be supplied to the tray by a second fluid pump. A proportion of the fluid in the tray may continually be drained and replaced with fresh fluid from the fluid supply tank to control the concentration of unwanted substances in the fluid.

The evaporative humidifier and cooler apparatus will be cleaned dependent on the condition of the cooling and humidification media. The sensor device is configured to detect characteristics of the fluid. Based on data achieved from the detection of the characteristics of the fluid, the condition of the cooling and humidification media can be determined. The type of cleaning is performed based on the condition of the cooling and humidification media. Dependent on the condition of the cooling and humidification media, at least one cleaning fluid is supplied to the cooling and humidification media. The data from the sensor device is communicated to the control device. The data is processed in the control device and based on the data from the sensor device a suitable cleaning fluid or a combination of cleaning fluids may be supplied to the cooling and humidification media. The at least one cleaning fluid may be supplied directly to the cooling and humidification media or to the fluid, which is distributed by the fluid distribution element to the cooling and humidification media. When supplying the at least one cleaning fluid to the cooling and humidification media, the evaporative humidifier and cooler apparatus will be cleaned.

According to an aspect, determining the condition of the cooling and humidification media comprises determining the pH-value, hardness, turbidity, salt content, and/or presence of bacteria/fungi in the fluid downstream of the cooling and humidification media.

The sensor device is configured to detect characteristics of the fluid connected to the pH-value, hardness, turbidity, salt content, and/or presence of bacteria/fungi in the fluid. Based on these detected characteristics of the fluid, data is achieved from the sensor device for determining the pH-value, hardness, turbidity, salt content, and/or presence of bacteria/ fungi in the fluid. Alternatively, the data achieved from the sensor device is processed in the control device in order to determining the pH-value, hardness, turbidity, salt content, and/or presence of bacteria/fungi in the fluid. Based on this information, the condition of the cooling and humidification media may be determined. The sensor device may be arranged in the tray and in contact with the fluid in the tray.

According to an aspect, supplying at least one cleaning fluid to the cooling and humidification media dependent on the condition of the cooling and humidification media comprises determining a dosage of the at least one cleaning fluid based on the condition of the cooling and humidification media.

The sensor is configured to detect characteristics of the fluid connected to the pH-value, hardness, turbidity, salt content, and/or presence of bacteria/fungi in the fluid. The concentration or grade of the pH-value, hardness, turbidity, salt, and/or bacteria/fungi in the fluid may be detected by the sensor device. Based on this information, the condition of the cooling and humidification media may be determined, and thus a dosage of the at least one cleaning fluid may be determined. The dosage of the at least one cleaning fluid may also be dependent on the characteristics of the at least one cleaning fluid. The at least one cleaning fluid may preferably be environmentally friendly.

According to an aspect, supplying at least one cleaning fluid to the cooling and humidification media comprises supplying the at least one cleaning fluid to the tray.

A first fluid pump may be connected to the fluid distribution element, wherein the first fluid pump is configured to deliver fluid to the fluid distribution element. The fluid distribution element is configured to distribute the fluid to the cooling and humidification media. The first fluid pump may suck the fluid from the tray and deliver the fluid to the fluid distribution element. Supplying the at least one cleaning fluid to the tray results in that the cleaning fluid will be mixed with the fluid in the tray. The blended fluid in the tray and the cleaning fluid are supplied to the fluid distribution element, which distributes the blended fluid in the tray and the cleaning fluid the cooling and humidification media for cleaning the cooling and humidification media. The blended fluid in the tray and the cleaning fluid may be supplied to the fluid distribution element by the first fluid pump. The at least one cleaning fluid may be supplied to the tray by a third fluid pump. Alternatively, the tray may be drained before supplying the cleaning fluid to the tray. When the cleaning fluid has been supplied to the tray, the cleaning fluid is supplied to the fluid distribution element, which distributes the cleaning fluid to the cooling and humidification media for cleaning the cooling and humidification media. In this case, only cleaning fluid may be supplied to the fluid distribution element by the first fluid pump.

According to an aspect, supplying the at least one cleaning fluid to the cooling and humidification media comprises supplying the at least one cleaning fluid to the fluid distribution element.

The first fluid pump may be connected to the fluid distribution element, wherein the first fluid pump is configured to deliver fluid to the fluid distribution element. The first fluid pump may suck the fluid from the tray and deliver the fluid to the fluid distribution element. The at least one cleaning fluid may be supplied to the fluid distribution element by a third fluid pump. Before reaching fluid distribution element, the at least one cleaning fluid may pass a regulator valve, which is arranged between the third fluid pump and the fluid distribution element. Also the fluid sucked from the tray by means of the first fluid pump may pass the regulator valve. The at least one cleaning fluid to may be mixed with the fluid in the tray by regulating the regulator valve. The blended fluid in the tray and the cleaning fluid may be supplied to the fluid distribution element by the first fluid pump. Alternatively, the regulator valve may close the connection between the tray and the fluid distribution element, so that only cleaning fluid is supplied to the fluid distribution element, which distributes the cleaning fluid to the cooling and humidification media for cleaning the cooling and humidification media.

According to an aspect, determining the condition of the cooling and humidification media comprises circulating fluid from the tray to a container comprising the sensor device.

The container may be separated from the tray. The fluid in the container may be separated from the fluid in the tray. The fluid from the tray may be circulated to the container by a fourth fluid pump. The sensor device may be arranged in the container and in contact with the fluid circulated from the tray. The fluid in the container may be circulated back to the tray by a fifth fluid pump. Such container with the sensor device may be connectable to a tray of an evaporative humidifier and cooler apparatus in order to determining the condition of the cooling and humidification media.

According to an aspect, supplying the at least one cleaning fluid to the cooling and humidification media comprises supplying a first cleaning fluid when the cooling and humidification media has a condition requiring de-scaling of the cooling and humidification media.

Minerals, salt, bacteria and/or fungi in the fluid may result in deposits and sediments on the cooling and humidification media, may result in a need for de-scaling of the cooling and humidification media. By detecting characteristics of the fluid connected to the pH-value, hardness, turbidity, salt content, and/or presence of bacteria/fungi in the fluid, the sensor device alone or the control device may determine if the cooling and humidification media has a condition requiring de-scaling of the cooling and humidification media. The first cleaning fluid has characteristics, which will clean the cooling and humidification media from deposits and thus de-scaling of the cooling and humidification media. De-scaling the cooling and humidification media is a result of cleaning the evaporative humidifier and cooler apparatus. The first cleaning fluid may preferably be environmentally friendly.

According to an aspect, supplying the at least one cleaning fluid to the cooling and humidification media comprises supplying a second cleaning fluid when the cooling and humidification media has a condition requiring disinfection of the cooling and humidification media.

Minerals, salt, bacteria and/or fungi in the fluid may result in a need of disinfection of the cooling and humidification media. By detecting characteristics of the fluid connected to the pH-value, hardness, turbidity, salt content, and/or presence of bacteria/fungi in the fluid, the sensor device alone or the control device may determine if the cooling and humidification media has a condition which requires disinfection of the cooling and humidification media. The second cleaning fluid has characteristics, which will clean the cooling and humidification media from minerals, salt, bacteria and/or fungi and thus disinfect the cooling and humidification media. Disinfection of the cooling and humidification media is a result of cleaning the evaporative humidifier and cooler apparatus. The second cleaning fluid may preferably be environmentally friendly.

The present disclosure also relates to a computer program comprising instructions which, when the program is executed by a computer, causes the computer to carry out the method disclosed above. The invention further relates to a computer-readable medium comprising instructions, which when executed by a computer causes the computer to carry out the method disclosed above. The method may be comprised in pre-programmed software, which may be implemented into the drilling unit suitable for utilizing the method. The pre-programmed software may be stored in the control device. Alternatively, or in combination, the software may be stored in a memory or in computer at a distance from the control device.

According to the present disclosure, a system comprising an evaporative humidifier and cooler apparatus for humidification and cooling of air, a control device and a sensor device arranged in communication with the control device is provided. The apparatus comprising: a cooling and humidification media, which is configured to receive and evaporate a fluid; a fluid distribution element, which is configured to distribute the fluid to the cooling and humidification media; and a tray arranged to collect fluid downstream of the cooling and humidification media; wherein the fluid distributed by the fluid distribution element is collected from the tray; and wherein the control device is configured to determine the condition of the cooling and humidification media based on data from the sensor device arranged in fluid communication with the fluid downstream of the cooling and humidification media; and supply at least one cleaning fluid to the cooling and humidification media dependent on the condition of the cooling and humidification media.

The evaporative humidifier and cooler apparatus of the system will be cleaned by the at least one cleaning fluid. The sensor device is arranged in fluid communication with the fluid downstream of the cooling and humidification media. In a circulating process, where the fluid is collected in a tray after the fluid has passed the cooling and humidification media, the fluid is brought back to the cooling and humidification media by for an example a circulating pump. Thus, the sensor device may be arranged in fluid communication with the fluid at any position in a circuit containing the cooling and humidification media, since any position in a circuit will be a position downstream of the cooling and humidification media. Data from the sensor device is communicated to the control device. The data is processed in the control device. Based on the data, the condition of the cooling and humidification media can be determined and thus a suitable cleaning fluid or a combination of cleaning fluids may be supplied to the cooling and humidification media. When supplying the at least one cleaning fluid to the cooling and humidification media, the evaporative humidifier and cooler apparatus will be cleaned.

It will be appreciated that all the examples described for the method aspect of the disclosure performed by the control device are also applicable to the system aspect of the disclosure. That is, the control device of the system may be configured to perform any one of the steps of the method according to the various examples described above. Thus, according to the following aspects, the control device of the system may be configured to perform the method steps according to the corresponding examples and aspects described above.

According to an aspect, the control device may thus be configured to determine the condition of the cooling and humidification media by determining the pH-value, hardness, turbidity, salt content, and/or presence of bacteria/fungi in the fluid downstream of the cooling and humidification media. According to a further aspect, the control device may be configured to supply the at least one cleaning fluid to the cooling and humidification media dependent on the condition of the cooling and humidification media by determining a dosage of the at least one cleaning fluid based on the condition of the cooling and humidification media. According to a further aspect, the control device may be configured to supply the at least one cleaning fluid to the cooling and humidification media by supplying the at least one cleaning fluid to the tray. According to a further aspect, the control device may be configured to supply the at least one cleaning fluid to the cooling and humidification media by supplying the at least one cleaning fluid to the fluid distribution element. According to a further aspect, the system may further comprising a container comprising the sensor device, the container being arranged in fluid communication with the tray, wherein the control device is configured to circulate fluid from the tray to the container. According to a further aspect, the control device is configured to supply the at least one cleaning fluid to the cooling and humidification media comprises supplying a first cleaning fluid when the cooling and humidification media has a condition requiring de-scaling of the cooling and humidification media. According to a further aspect, the control device may be configured to supply the at least one cleaning fluid to the cooling and humidification media comprises supplying a second cleaning fluid when the cooling and humidification media has a condition requiring disinfection of the cooling and humidification media.

The fluid pumps described above may be driven by electric motors.

The method, performed by a control device, for cleaning an evaporative humidifier and cooler apparatus, the system comprising an evaporative humidifier and cooler apparatus, the computer program and the computer-readable medium will now be described together with the appended drawings.

FIG. 1 schematically illustrate a system 200 according to a first example. The system comprising an evaporative humidifier and cooler apparatus 1 for humidification and cooling of air. A control device 100 is provided, which is connected to a sensor device 10. The apparatus 1 comprising a cooling and humidification media 2, which is configured to receive and evaporate a fluid 4. A fluid distribution element 6 is configured to distribute the fluid 4 to the cooling and humidification media 2. A tray 8 is arranged to collect fluid 4 downstream of the cooling and humidification media 2. The fluid 4 distributed by the fluid distribution element 6 is collected from the tray 8. A first fluid pump 18 is be connected to the fluid distribution element 6, wherein the first fluid pump 18 is configured to deliver fluid 4 to the fluid distribution element 6. The first fluid pump 18 is arranged at a fluid pipe arranged between the tray 8 and the fluid distribution element 6. The first fluid pump 18 may suck the fluid 4 from the tray 8 and deliver the fluid 4 to the fluid distribution element 6. A fluid supply tank 20 is in fluid connection with the tray 8 by a fluid pipe. Fluid 4 may be supplied to the tray 8 from the fluid supply tank 20. The fluid 4 from the fluid supply tank 20 is supplied to the tray 8 by a second fluid pump 22. Vertically directed arrows 23 represent the direction of fluid 4 through the fluid distribution element 6, the cooling and humidification media 2 and further to a fluid tray 8. A drain valve 24 is arranged at the tray 8 and the fluid 4 in the tray 8 is may be drained via the drain valve 24. An additional sensor device 26 may be connected to the control device 100, which additional sensor device 26 is may detect temperature and humidity in the air surrounding the apparatus 1.

The control device 100 is configured to determine the condition of the cooling and humidification media 2 based on data from the sensor device 10 arranged in fluid communication with the fluid 4 downstream of the cooling and humidification media 2. The condition of the cooling and humidification media 2 may be determined by determining the pH-value, hardness, turbidity, salt content, and/or presence of bacteria/fungi in the fluid 4 downstream of the cooling and humidification media 2. Depending on the condition of the media 2 a first cleaning fluid 12 and/or a second cleaning fluid 14 will be supplied to the cooling and humidification media 2.

A container 16 is provided, which contains the fluid 4 and the first and second cleaning fluids 12, 14. The fluids 4, 12, 14 are separated from each other in the container by partition walls 28 arranged in the container 16. Three independent containers may also constitute the container 16. According to the first example, the part of the container 16 comprising the fluid 4 is arranged in fluid communication with the tray 8 by means of a pipes comprising a fourth fluid pump 30 and a fifth fluid pump 32 and a first valve 34. The part of the container 16 containing the fluid 4 also comprising the sensor device 10. The control device 100 is configured to circulate fluid 4 from the tray 8 to the part of the container 16 containing the fluid 4. The parts of the container 16 containing the first and second cleaning fluids 12, 14 are in fluid connection with the tray 8 by pipes comprising a third fluid pump 36 and a second valve 38 and third valve 40.

The control device 100 is configured to supply the first and/or second cleaning fluid 12, 14 to the cooling and humidification media 2 by supplying the first and/or cleaning fluid 12, 14 to the tray 8. The control device 100 is configured to supply a first cleaning fluid 12 to the cooling and humidification media 2 when the cooling and humidification media 2 has a condition requiring de-scaling of the cooling and humidification media 2. The control device 100 is configured to supply a second cleaning fluid 14 to the cooling and humidification media 2 when the cooling and humidification media 2 has a condition requiring disinfection of the cooling and humidification media 2. In addition, based on the condition of the cooling and humidification media 2, the control device 100 is configured to determine a dosage of the first and/or cleaning fluid 12, 14.

A fan 42 is configured to generate an air flow through the cooling and humidification media 2. The fan 42 may generate a forced air flow through the cooling and humidification media 2. The fan 42 may be arranged behind the cooling and humidification media 2 and thus force the air flow through the cooling and humidification media 2 by a pressure. Alternatively, or in combination, a fan 42 may be arranged in front of the cooling and humidification media 2 and thus force the air flow through the cooling and humidification media 2 by sucking the air flow through the cooling and humidification media 2. The fan 42 may generate a regulated forced air flow through the first and second cooling and humidification media 2.

Figure 2:
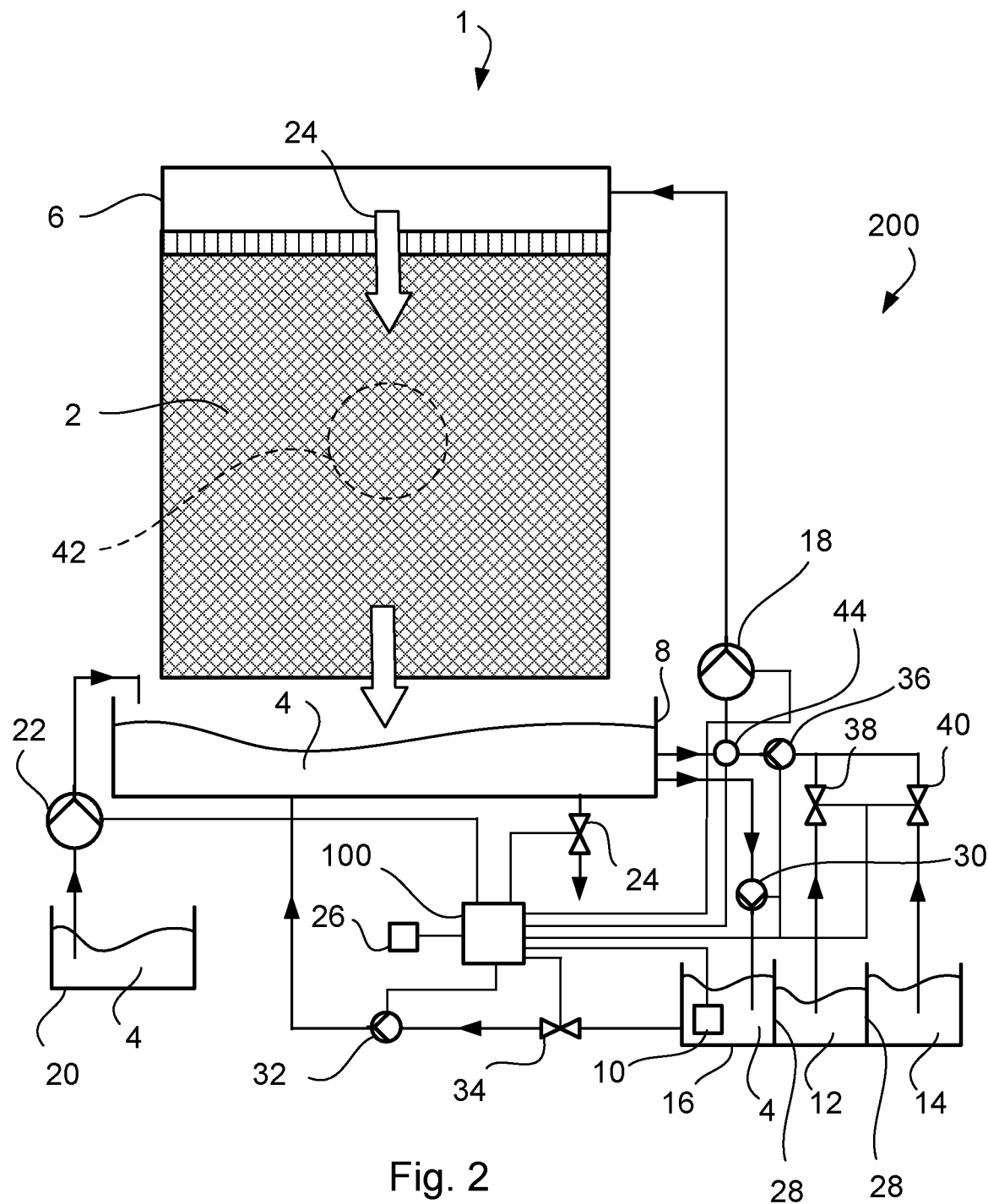

FIG. 2 schematically illustrate a system 200 according to a second example. 15. The system of FIG. 2 corresponds to the system of FIG. 1 with the difference that the control device 100 is configured to supply the first cleaning fluid 12 and/or the second cleaning fluid 14 to the cooling and humidification media 2 by supplying the first cleaning fluid 12 and/or the second cleaning fluid 14 to the fluid distribution element 6. The first cleaning fluid 12 and/or the second cleaning fluid 14 are supplied to the fluid distribution element 6 by the third fluid pump 36. A regulator valve 44 is arranged between the third fluid pump 36 and the fluid distribution element 6. Before reaching the fluid distribution element 6, the first cleaning fluid 12 and/or the second cleaning fluid 14 will pass the regulator valve 44, which is arranged between the third fluid pump 36 and the fluid distribution element 6. Also the fluid 4 sucked from the tray 8 by means of the first fluid pump 18 may pass the regulator valve 44. The first cleaning fluid 12 and/or the second cleaning fluid 14 may be mixed with the fluid 4 in the tray 8 by regulating the regulator valve 44. The fluid in the tray 8 and the first cleaning fluid 12 and/or the second cleaning fluid 14 may together be supplied to the fluid distribution element 6 by the first fluid pump 18. Alternatively, the regulator valve 44 may close the connection between the tray 8 and the fluid distribution element, so that only the first cleaning fluid 12 and/or the second cleaning fluid 14 is supplied to the fluid distribution element 6, which distributes the first cleaning fluid 12 and/or the second cleaning fluid 14 to the cooling and humidification media 2 for cleaning the cooling and humidification media 2.

Figure 3:
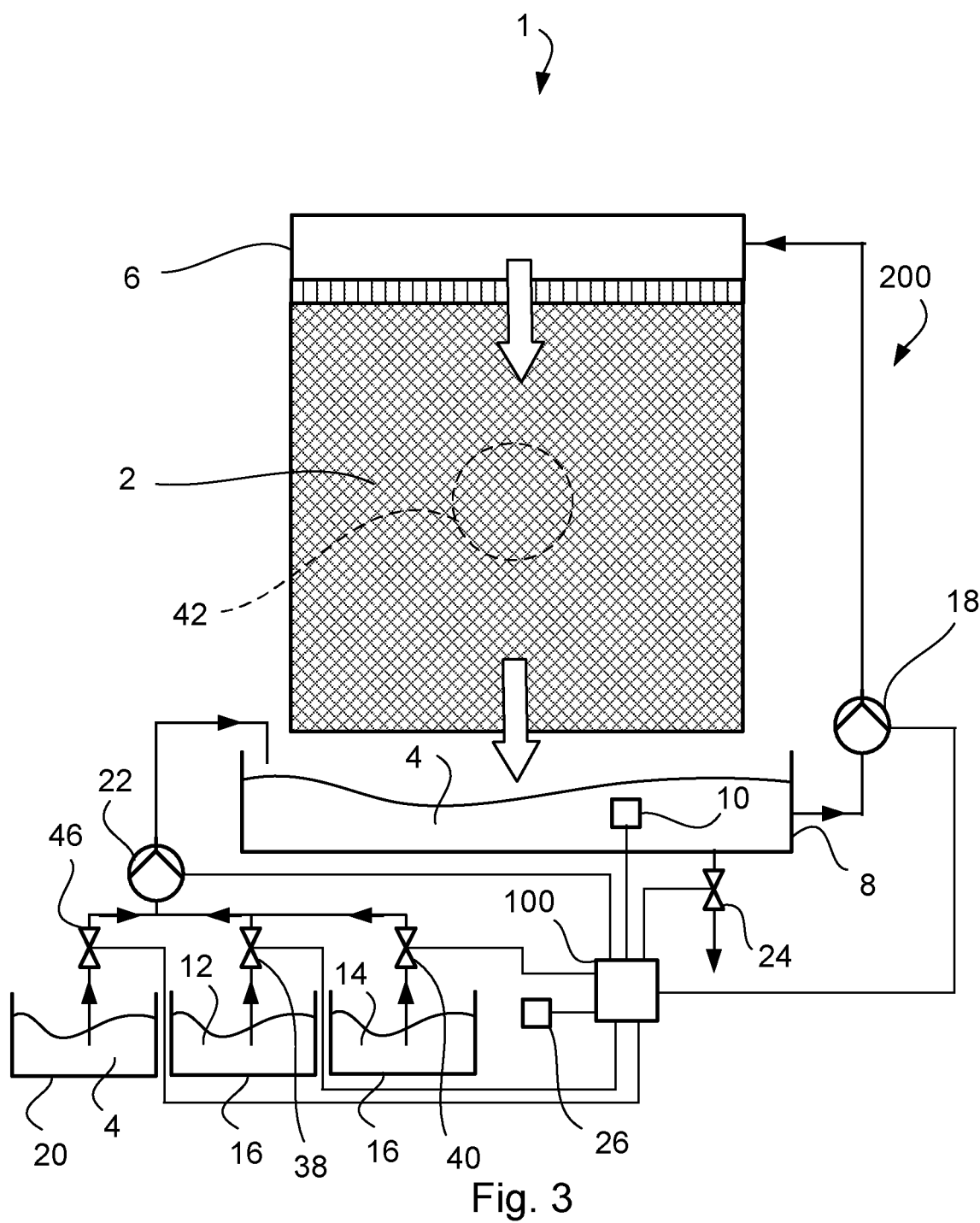

FIG. 3 schematically illustrate a system 200 according to a third example. The system of FIG. 3 corresponds to the system of FIG. 1 with the difference that the sensor device 10 is arranged in the tray 8. The sensor device 10 is configured to be in contact with fluid 4 in the tray 8. The container 16 comprises a container for the first cleaning fluid 12 and a container for the second cleaning fluid 14. The fluid supply tank 20 and the containers 16 for the first cleaning fluid 12 and a container for the second cleaning fluid 14 are in fluid connection with the tray 8 by means of fluid pipes. The second fluid pump 22 is configured to suck the fluid 4 from the fluid supply tank 20 and also from the containers 16 for the first cleaning fluid 12 and the second cleaning fluid 14. A fourth valve 46 is arranged between the fluid supply tank 20 and the second fluid pump 22.

Figure 4:
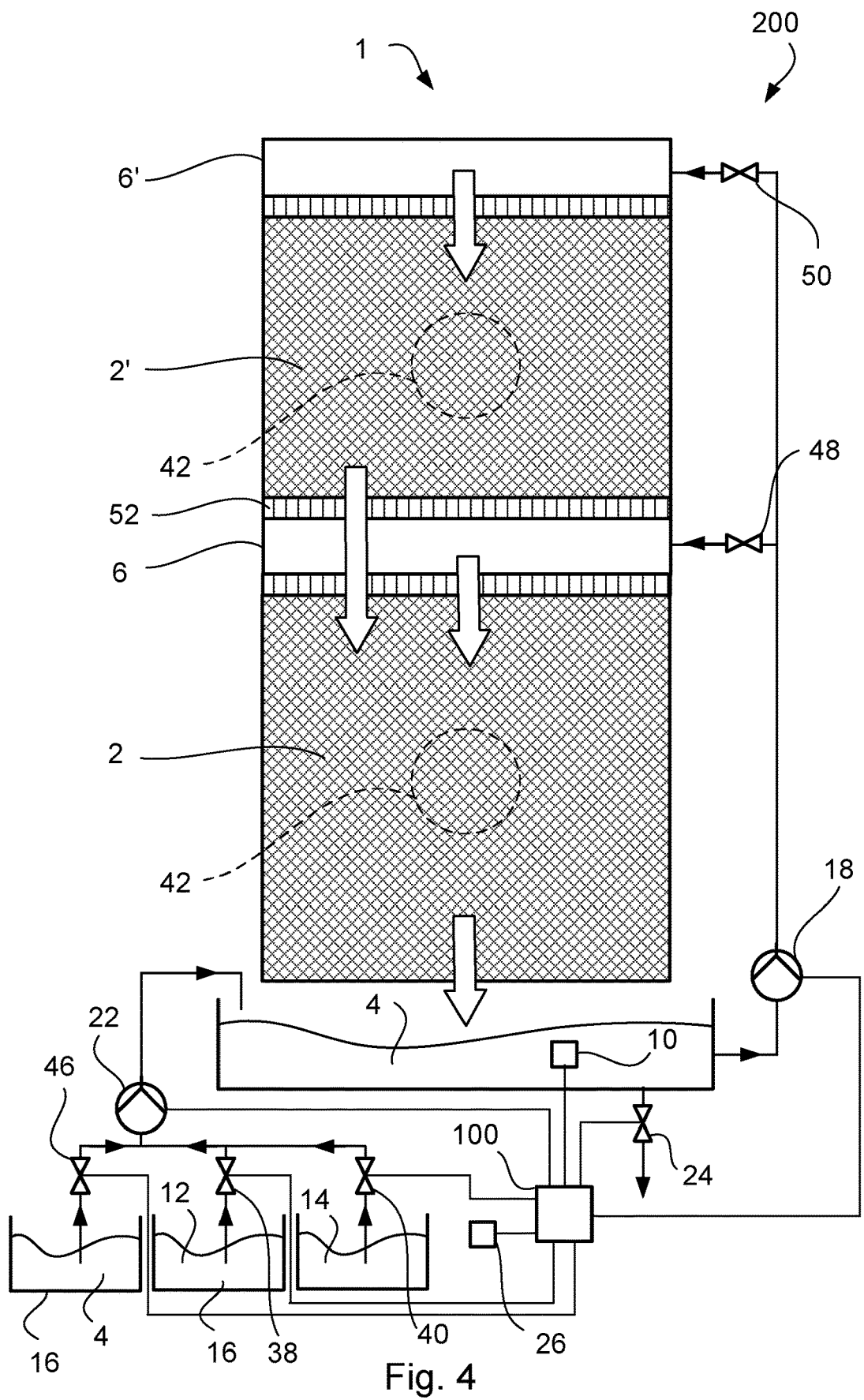

FIG. 4 schematically illustrate a system 200 according to a fourth example. The system of FIG. 4 corresponds to the system of FIG. 3 with the difference that an additional cooling and humidification media 2' and an additional fluid distribution element 6' are arranged on and above the cooling and humidification media 2 and the fluid distribution element 6 shown in FIG. 3. The tray 8 is in fluid communication with both the cooling and humidification media 2 and the fluid distribution element 6, and the additional cooling and humidification media 2' and an additional fluid distribution element 6' via fluid pipes. A fifth valve 48 is arranged between the first fluid pump 18 and the fluid distribution element 6. A sixth valve 50 is arranged between the first fluid pump 18 and the additional fluid distribution element 6'. The fifth and sixth valves 48, 50 may be individually controlled or commonly controlled.

The fluid distribution element 6 comprises connection means 52, for connecting the fluid distribution element 6 to the additional cooling and humidification media 2'. The additional fluid distribution element 6' is configured to transfer the fluid 4, which is distributed by the additional fluid distribution element 6', to the additional cooling and humidification media 2' and further to the cooling and humidification media 2.

Figure 5:
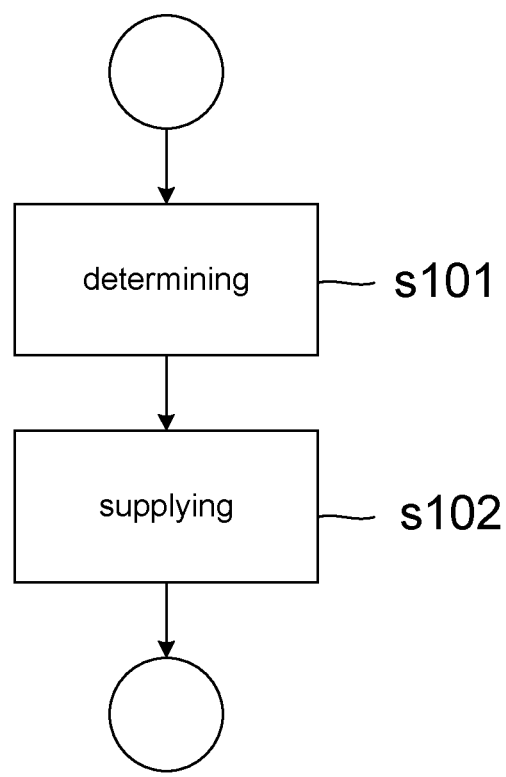
FIG. 5 shows a flowchart of a method according to an example.

FIG. 5 shows a flowchart of a method according to an example. The method is performed by a control device 100, for cleaning an evaporative humidifier and cooler apparatus 1 for humidification and cooling of air. The method thus relates to the system 200 comprising the apparatus 1 disclosed in FIGS. 1-4. The apparatus 1 comprises a cooling and humidification media 2, which is configured to receive and evaporate a fluid 4; a fluid distribution element 6, which is configured to distribute the fluid 4 to the cooling and humidification media 2; and a tray 8 arranged to collect fluid 4 downstream of the cooling and humidification media 2; wherein the fluid 4 distributed by the fluid distribution element 6 is collected from the tray 8.

The method comprising: determining s101 the condition of the cooling and humidification media 2 based on data from a sensor device 10 arranged in fluid communication with the fluid 4 downstream of the cooling and humidification media 2; and supplying s102 at least one cleaning fluid 12; 14 to the cooling and humidification media 2 dependent on the condition of the cooling and humidification media 2.

Determining s101 the condition of the cooling and humidification media 2 comprises determining the pH-value, hardness, turbidity, salt content, and/or presence of bacteria/fungi in the fluid 4 downstream of the cooling and humidification media 2. Supplying s102 at least one cleaning fluid 12; 14 to the cooling and humidification media 2 dependent on the condition of the cooling and humidification media 2 comprises determining a dosage of the at least one cleaning fluid 12; 14 based on the condition of the cooling and humidification media 2. Supplying s102 at least one cleaning fluid 12; 14 to the cooling and humidification media 2 comprises supplying the at least one cleaning fluid 12; 14 to the tray 8. Supplying s102 the at least one cleaning fluid 12; 14 to the cooling and humidification media 2 comprises supplying the at least one cleaning fluid 12; 14 to the fluid distribution element 6. Determining s101 the condition of the cooling and humidification media 2 comprises circulating fluid from the tray 8 to a container 16 comprising the sensor device 10. Supplying s102 the at least one cleaning fluid 12; 14 to the cooling and humidification media 2 comprises supplying a first cleaning fluid 12 when the cooling and humidification media 2 has a condition requiring de-scaling of the cooling and humidification media 2. Supplying s102 the at least one cleaning fluid 12; 14 to the cooling and humidification media 2 comprises supplying a second cleaning fluid 14 when the cooling and humidification media 2 has a condition requiring disinfection of the cooling and humidification media 2.

Figure 6:
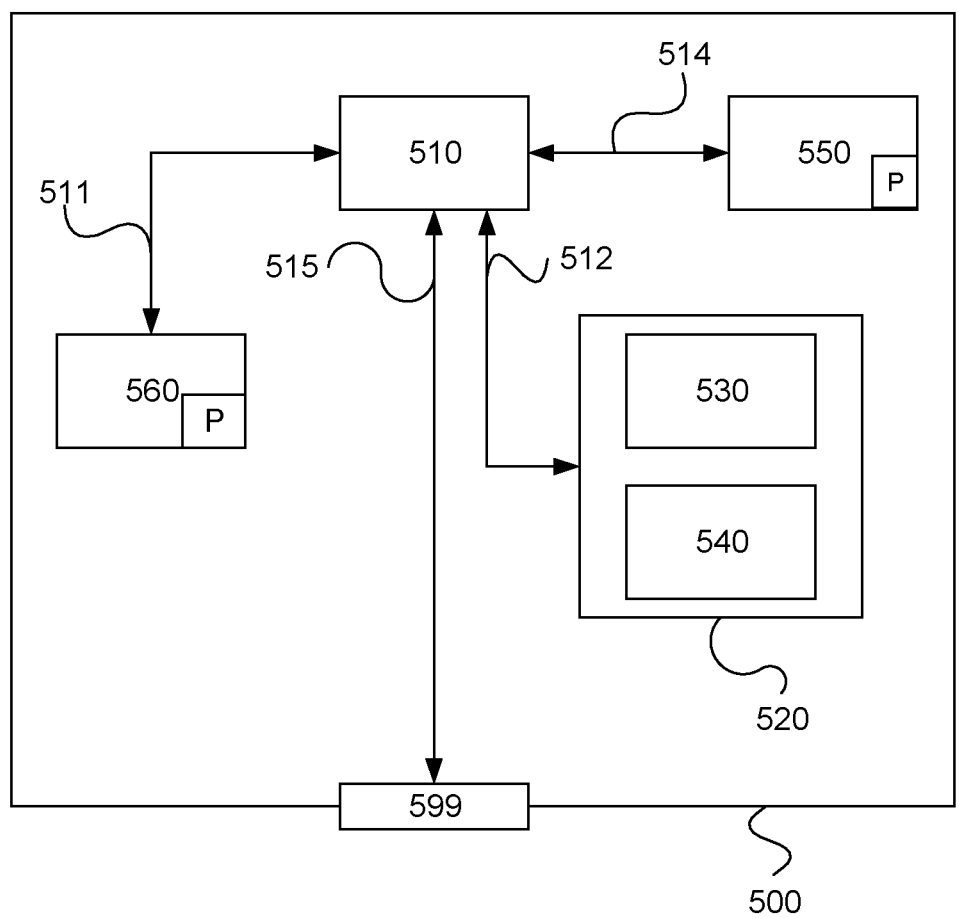
FIG. 6 schematically illustrates a control device or computer according to an example.

FIG. 6 schematically illustrates a diagram of a version of a device 500. The control device 25 described with reference to FIG. 1 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises instructions for carry out the above-mentioned method. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various examples and with the various modifications appropriate to the intended use.

It should be noted that the system 200 according to the examples can be arranged to perform any of the steps or actions described in relation to the method. It should also be understood that the method according to the embodiment can further comprise any of the actions attributed to a feature of the system 200 described. The same applies to the computer program product and the computer-readable medium. Any type of air may be treated. The air may comprise gases and particles comprising any type of chemical substances.

The invention claimed is:

1. A method, performed by a control device, for cleaning an evaporative humidifier and cooler apparatus for humidification and cooling of air, the apparatus comprising:
    cooling and humidification media, configured to receive and evaporate a fluid;
    a fluid distribution element, which is configured to distribute the fluid to the cooling and humidification media; and
    a tray arranged to collect fluid downstream of the cooling and humidification media;
    wherein the fluid distributed by the fluid distribution element is collected from the tray;
    wherein the method comprises:
        determining a condition of the cooling and humidification media based on data from a sensor device arranged in fluid communication with the fluid downstream of the cooling and humidification media; and
        supplying at least one cleaning fluid to the cooling and humidification media dependent on the condition of the cooling and humidification media, wherein supplying the at least one cleaning fluid to the cooling and humidification media comprises supplying a first cleaning fluid when the cooling and humidification media has a condition requiring de-scaling of the cooling and humidification media and/or supplying a second cleaning fluid when the cooling and humidification media has a condition requiring disinfection of the cooling and humidification media.

2. The method according to claim 1, wherein determining the condition of the cooling and humidification media comprises determining the pH-value, hardness, turbidity, salt content, and/or presence of bacteria/fungi in the fluid downstream of the cooling and humidification media.

3. The method according to claim 1, wherein supplying at least one cleaning fluid to the cooling and humidification media dependent on the condition of the cooling and humidification media comprises determining a dosage of the at least one cleaning fluid based on the condition of the cooling and humidification media.

4. The method according to claim 1, wherein supplying at least one cleaning fluid to the cooling and humidification media comprises supplying the at least one cleaning fluid to the tray.

5. The method according to claim 1, wherein supplying the at least one cleaning fluid to the cooling and humidification media comprises supplying the at least one cleaning fluid to the fluid distribution element.

6. The method according to claim 1, wherein determining the condition of the cooling and humidification media comprises circulating fluid from the tray to a container comprising the sensor device.

7. A computer program (P) comprising instructions which, when the program is executed by a computer, cause the computer to carry out the method according to claim 1.

8. A computer-readable medium comprising instructions, which when executed by a computer, cause the computer to carry out the method according to claim 1.

9. A system comprising an evaporative humidifier and cooler apparatus for humidification and cooling of air, a control device and a sensor device arranged in communication with the control device, the apparatus comprising:
    cooling and humidification media, configured to receive and evaporate a fluid;
    a fluid distribution element, which is configured to distribute the fluid to the cooling and humidification media; and
    a tray arranged to collect fluid downstream of the cooling and humidification media;
    wherein the fluid distributed by the fluid distribution element is collected from the tray;
    wherein the control device is configured to determine a condition of the cooling and humidification media based on data from the sensor device arranged in fluid communication with the fluid downstream of the cooling and humidification media; and supply at least one cleaning fluid to the cooling and humidification media dependent on the condition of the cooling and humidification media; and
    wherein the control device configured to supply the at least one cleaning fluid to the cooling and humidification media comprises supplying a first cleaning fluid when the cooling and humidification media has a condition requiring de-scaling of the cooling and humidification media; and/or wherein the control device configured to supply the at least one cleaning fluid to the cooling and humidification media comprises supplying a second cleaning fluid when the cooling and humidification media has a condition requiring disinfection of the cooling and humidification media.

10. The system according to claim 9, wherein the control device is configured to determine the condition of the cooling and humidification media by determining the pH-value, hardness, turbidity, salt content, and/or presence of bacteria/fungi in the fluid downstream of the cooling and humidification media.

11. The system according to claim 9, wherein the control device is configured to supply the at least one cleaning fluid to the cooling and humidification media dependent on the condition of the cooling and humidification media by determining a dosage of the at least one cleaning fluid based on the condition of the cooling and humidification media.

12. The system according to claim 9, wherein the control device is configured to supply the at least one cleaning fluid to the cooling and humidification media by supplying the at least one cleaning fluid to the tray.

13. The system according to claim 9, wherein the control device is configured to supply the at least one cleaning fluid to the cooling and humidification media by supplying the at least one cleaning fluid to the fluid distribution element.

14. The system according to claim 9, further comprising a container comprising the sensor device, the container being arranged in fluid communication with the tray, wherein the control device is configured to circulate fluid from the tray to the container.

* * * * *